United States Patent [19]

Sonesson et al.

[11] Patent Number: 5,348,223
[45] Date of Patent: Sep. 20, 1994

[54] METHOD AND APPARATUS FOR CONTROLLING TEMPERATURE OF A LIQUID

[75] Inventors: Leif Sonesson, Eslöv; Jörgen Olsson, Malmö, both of Sweden

[73] Assignee: Arjo Hospital Equipment AB, Eslöv, Sweden

[21] Appl. No.: 867,092

[22] PCT Filed: Oct. 25, 1991

[86] PCT No.: PCT/SE91/00716
§ 371 Date: Jun. 29, 1992
§ 102(e) Date: Jun. 29, 1992

[87] PCT Pub. No.: WO92/08178
PCT Pub. Date: May 14, 1992

[30] Foreign Application Priority Data

Oct. 29, 1990 [SE] Sweden ................................ 9003459

[51] Int. Cl.⁵ .............................................. G05D 23/13
[52] U.S. Cl. ................................. 236/12.12; 137/597
[58] Field of Search ..................... 236/12.11, 12.12; 137/597, 601

[56] References Cited

U.S. PATENT DOCUMENTS

| | | | |
|---|---|---|---|
| 2,506,700 | 5/1950 | Chace | 236/12 |
| 2,793,812 | 5/1957 | McDonald | 236/12.11 X |
| 2,915,298 | 12/1959 | Hamlin et al. | 236/12.11 X |
| 4,558,817 | 12/1985 | Kiendl | 236/12.12 |
| 4,635,844 | 1/1987 | Barrett | 236/12.12 |
| 4,711,393 | 12/1987 | Lee | 236/12.15 |
| 4,753,265 | 6/1988 | Barrett et al. | 137/597 X |

*Primary Examiner*—William E. Tapocai
*Attorney, Agent, or Firm*—Ladas & Parry

[57] ABSTRACT

A method and an apparatus for producing a continuous liquid flow at a controlled temperature. The apparatus includes mixers (1, 2) which, upstream, are connected to a supply conduit (3) for hot liquid under pressure and a supply conduit (4) for cold liquid under pressure. Each respective mixer has an outlet (5, 6) connected to a common discharge conduit (9) by a first outlet conduit (7, 8). The common conduit (9) is provided with a tap (10) disposed downstream of the interconnection of the outlet conduits with the common conduit (9). The temperature of the liquid which is to be discharged through conduit (9) is adjusted in that hot and cold liquid are mixed in the mixers from which the liquid is supplied to the common conduit (9).

9 Claims, 1 Drawing Sheet

METHOD AND APPARATUS FOR CONTROLLING TEMPERATURE OF A LIQUID

TECHNICAL FIELD

The present invention relates to an apparatus for supplying a liquid, e.g. water in, a continuous liquid flow at a controlled temperature, even in the event of large variations in the liquid flow.

BACKGROUND ART

There is, in many fields, a need for such an apparatus, for example in industrial applications, in the domestic environment, in the hospital environment, etc. In particular in practical applications in which it must be possible to vary the size of the liquid flow between large and small values, and in which only slight deviations from adjusted temperatures (norm values) are acceptable in the liquid in the flow discharged from the apparatus, extreme demands are placed on the function of the apparatus. Mixers designed for large liquid flows and disposed to discharge, in large flow volumes, liquid within a narrow temperature range are not suitable for use in small liquid flows, since the deviations from preset norm values will, as a rule, be unacceptably large. The same naturally applies if mixers designed to discharge liquid at small liquid flows with slight deviation from the norm value are upgraded in dimensions so as to produce large liquid flows, the mixer for small liquid flows will lose precision in temperature control and discharge liquid at a temperature which often considerably deviates from the norm values. Mixers designed to discharge liquid within a narrow temperature range in both small and large liquid flows are unknown in the art.

Patent specification EP 0 187 484 describes a technique in which computer control is employed to adjust the temperature of a discharged liquid flow to a determined value. The apparatus comprises a multiplicity of valves which are connected pairwise to a supply conduit for hot water and a supply conduit for cold water. From each one of the valves, the water is led to a common supply conduit. A temperature sensor is provided in the supply conduit and feeds back detected temperature to a control unit. Via control devices, the control unit selectively controls the opening and closing of the valves which, in such instance, either assume fully closed position or fully open position. In the use of the apparatus, the temperature of the liquid departing from the apparatus is controlled in that a number of valves connected to the supply conduit for cold water and a number of valves connected to the supply conduit for hot water are opened. In response to the information which the detector feeds back to the control unit, this unit modifies, when necessary, the relationship between the number of open valves for cold and hot water so that the mixture of water which is supplied to the supply conduit will have the correct temperature. In such an apparatus, it is not possible for each individual tapping occasion individually to regulate the flow quantity in those valves which are pairwise connected to supply conduits for cold and hot water, respectively, in order, by such regulation, to achieve a desired temperature during the individual supply occasion of that flow which departs from each pair of valves. The apparatus is primarily intended for relatively large flows, and temperature control is effected by wholly throttling and/or wholly opening the flow in one or more valves which are connected to the supply conduit for cold water and/or the supply conduit for hot water.

BRIEF SUMMARY OF THE INVENTION

The present invention discloses a simple and reliable solution to the problem considered hereinabove. According to the invention, first and second mixes are provided. One having smaller flow capacity than the other, each mixer being supplied with hot and cold liquid under pressure at respective inlets thereof, the outlet of each mixer being connected to a common conduit serving as a discharge conduit and containing a respective control tap. In further accordance with the invention, a second discharge conduit is provided which is connected to the mixer of smaller capacity and provided with its own respective control tap.

BRIEF DESCRIPTION OF THE ACCOMPANYING DRAWING

The present invention will now be described in greater detail hereinbelow, with particular reference to the accompanying Drawing, in which:

FIG. 1 schematically illustrates one embodiment of the apparatus according to the present invention.

DESCRIPTION OF PREFERRED EMBODIMENT

Figure 1:
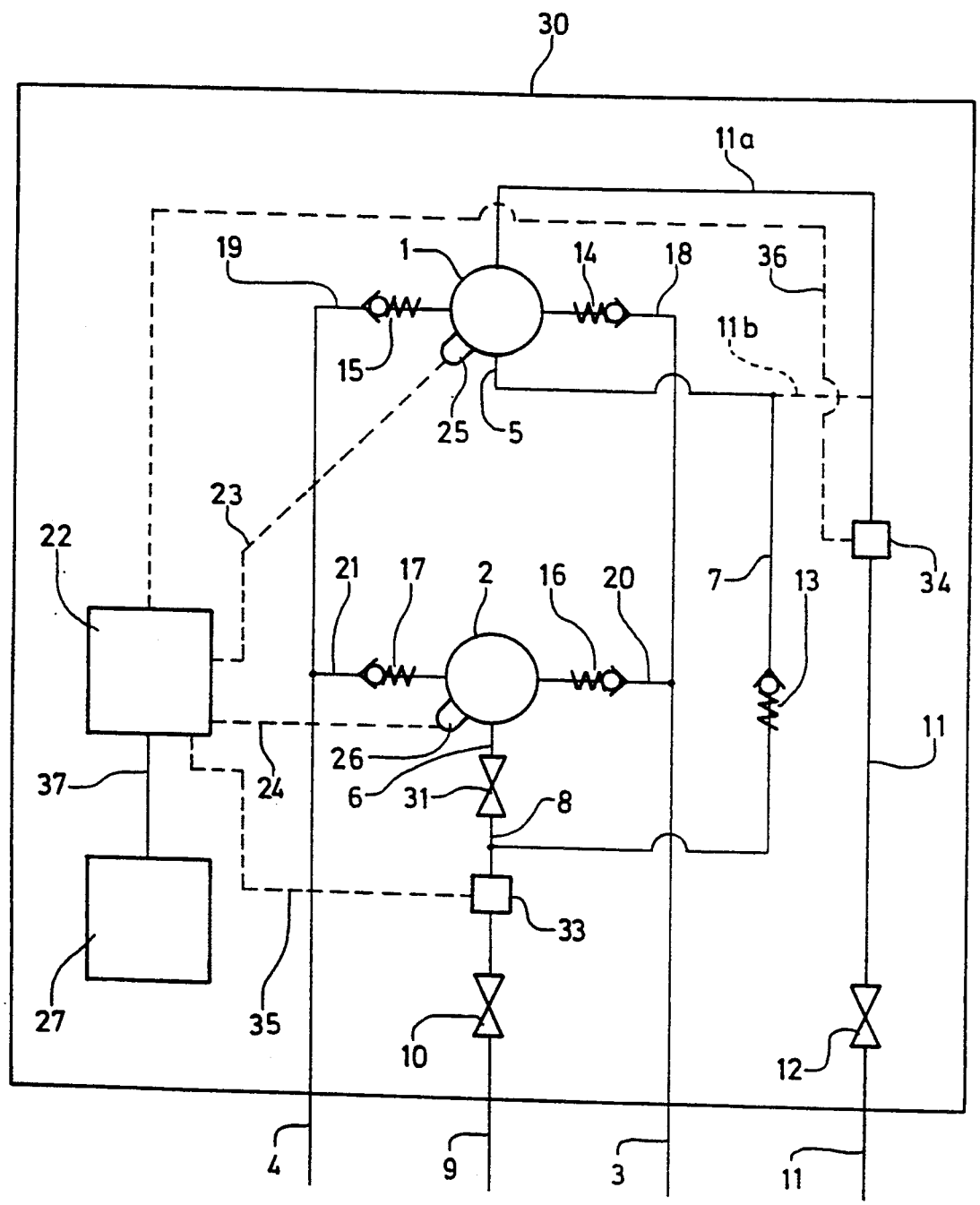

In the embodiment of the present invention illustrated in FIG. 1, there is shown a mixer 30 including a first part mixer 1 and a second part mixer 2. The mixer 30 is connected to a supply conduit 3 for cold liquid and a supply conduit 4 for hot liquid. A first discharge conduit or line 9 and a second discharge conduit or line 11 are connected to the mixer 30, in addition to which each respective discharge conduit is provided with its control valve or tap 10 and 12, respectively, hereinafter generally designated first tap 10 and second tap 12. In certain embodiments, more than one tap is disposed in each line. In such instance, the taps are arranged such that the taps in open position allow liquid flow out of each respective line irrespective of whether other taps are in the closed or opened position. The first discharge conduit 9 is dimensioned for a larger maximum liquid flow than the second discharge conduit 11. When, for example, the mixer is used in a bathroom, the first discharge conduit is suitable for use for filling a bath, while the second discharge conduit is connected to the bathroom shower.

The first part mixer 1 is connected, by means of a connecting conduit 18, to the supply conduit 3 for cold liquid and, by means of a connecting conduit 19, connected to the supply conduit 4 for hot liquid. The second part mixer 2 is correspondingly connected, by means of a connecting conduit 20, to the supply conduit 3 for cold liquid and, by means of a connecting conduit 21, is connected to the supply conduit 4 for hot liquid. In the connecting conduits 18,19 of the first part mixer 1, there are disposed non-return valves 14 and 15, respectively, and in the connecting conduits 20,21 of the second part mixer, there are similarly provided non return valves 16 and 17, respectively. The non-return valves are turned such that they prevent liquid flow from each respective part mixer to the supply conduits for hot and cold liquid, respectively.

The first part mixer 1 is provided with an outlet 5 which is connected to a first outlet conduit 7. The second part mixer 2 is provided with an outlet 6 which is connected to a second outlet conduit 8. The two outlet conduits 7 and 8 are connected to the first discharge conduit 9 of the mixer, which conduit is, thus, interconnected with the outlet 5 of the first part mixer and with the outlet 6 of second part mixer. A non return valve or shut-off valve 13 is disposed in the outlet conduit 7 of the first part mixer. In those practical applications in which the non-return valve is employed, this is turned so as to prevent liquid flow in a direction towards the first part mixer. In certain embodiments, a shut-off valve 31 is disposed in the second outlet conduit 8, i.e. in the flow direction ahead of the connection of the second part mixer 2 to first discharge conduit 9.

In FIG. 1, the mixer 30 is shown in one embodiment in which the second discharge conduit 11 is connected to the mixer and is provided with the second tap 12. As disclosed above, this second discharge conduit is intended to be employed when only a relatively lower liquid flow is required, for example a water flow which corresponds to that which is normally used when showering.

In the FIGURE, the second discharge conduit 11 is shown connected to the first part mixer 1 via a second outlet 32 thereof. In the FIGURE, the second outlet is shown as mechanically discrete from the previously disclosed first outlet 5 of the part mixer. In such instance, a connecting conduit 11a is generally connected between the second outlet 32 and the second discharge conduit 11. However, it will be obvious to a person skilled in the art that, in certain applications, the second discharge conduit 11 is connected to the first outlet 5 of the first part mixer. In embodiments in which the first part mixer 1 is only provided with the first outlet 5, a cross coupling 11b (shown by broken lines in the FIGURE) is generally provided between the first outlet 5 and the second discharge conduit 11.

FIG. 1 also shows an embodiment in which a central unit 22, for example an operating unit, is provided for simultaneous or separate adjustment of the first part mixer 1 and/or the second part mixer 2 to the desired norm value. In an extremely simple embodiment, both of the part mixers are adjusted by means of a mechanical transmission, while in other embodiments, at least one signal interconnection 23,24 is provided and is coupled to an operating device 25,26 disposed at at least one of the part mixers 1,2.

In one preferred embodiment, temperature sensors 33,34 are provided in the first and in the second discharge conduits 9,11, respectively. Each respective temperature sensor is connected to the central unit 22 by means of signal communication lines 35,36.

FIG. 1 shows one embodiment in which a norm value indicator 27 is connected to the central unit 22. As a rule, the norm value indicator is adjustable to the norm value relevant on each individual occasion of use, which, in one preferred embodiment, is transmitted to the central unit 22 by means of a signal communication line 37. As a rule, both the norm value indicator and the central unit are provided with electric circuits which serve for the requisite calculations for comparison between received norm values and temperature information received from the temperature sensors 33,34 and which transmit requisite signals for switching of the part mixers 1,2.

It will further be obvious to a person skilled in the art that more than two part mixers 1,2 may be included in the mixer 30 according to the present invention.

On employment of the apparatus for discharging liquid through the first discharge conduit 9, the first tap 10 is opened in the first discharge conduit, and also the shut-off valve 31 in those embodiments in which this valve is provided after the second part mixer 2. In those embodiments in which the first outlet conduit 7 is provided with the shut-off valve 12, this is opened as well. With this setting of the valves and taps, liquid will pass through both the first part mixer 1 and the second part mixer 2. On opening of the tap, the part mixers are set to discharge liquid at a predetermined temperature. On opening of the tap, the pressure in the outlets 5 and 6 of the first and second part mixers falls, whereby liquid is forced from the supply conduit 3 for cold liquid and from the supply conduit 4 for hot liquid via the connecting conduits 18-21 of the first part mixer 1 and the second part mixer 2 into the part mixers, hot and cold liquid being mixed in proportions which entail that that liquid which departs from each respective part mixer via their outlets, 5,6 is at a temperature corresponding to the adjustment setting of each respective part mixer.

When a slight flow of liquid is desired, only the second tap 12 is opened, liquid passing only through the first part mixer. The closed first tap 10, the shut-off valve 31 and/or the non-return valves 16,17 in the connecting conduits of the second part mixer to the supply conduits for cold and hot liquid, respectively, prevent liquid from flowing through the non-return valve 13 in the first outlet conduit 7 and through the second part mixer 2. Since liquid passes through the first part mixer and this is, as a rule, dimensioned for a relatively small liquid flow, the desired effect of reliable temperature control will also be achieved in applications in which the liquid flow is small.

In embodiments in which the shut-off valve 31 is disposed between the second part mixer 2 and the first discharge conduit 9, the situation will be achieved, with the above-mentioned valve in the closed position, with the second tap 12 in the closed position and with the first valve 10 in the opened position, that only the first part mixer 1 is passed by liquid which, in such instance, is led to the first discharge conduit 9. It will hereby be ensured that a slight liquid flow at a temperature which has minor deviations from the adjusted value passes out through the first discharge conduit 9.

In those embodiments of the valve in which temperature sensors are included, continuous information is fed back from the temperature sensors 33,34 to the central unit 22, relating to the temperature of the liquid flow which passes through each respective discharge conduit.

The central unit 22 compares this temperature information with adjusted norm values and, when necessary, corrects the adjustment setting of each respective part mixer in that signals are transmitted to operating devices 25 and 26, respectively, for switching the part mixers.

In certain practical applications, the second part mixer 2 is set at a temperature close to the norm value and, as a rule, slightly less than this value. Fine adjustment of the temperature takes place by means of the first part mixer 1 which regulates a relatively small liquid flow. Since the liquid from the second part mixer 2 is mixed with liquid from the first part mixer 1, the temperature of the liquid which flows through the first discharge conduit will be adjusted at values which have but minor deviations from the intended value. By means of signals received from the temperature sensor 33 in the first discharge conduit 9, information is fed back to the central unit 22 regarding the liquid temperature in the first discharge conduit. In the event of deviations from the norm value, the central unit primarily corrects the adjustment of the first part mixer 1 in that signals are transmitted to the operating device 25 of the first part mixer. In the event of major deviations from the norm value, the central unit transmits signals also to the operating device 26 of the second part mixer 2 for readjustment of the second part mixer.

Even though the first part mixer 1 and the second part mixer 2 are shown in FIG. 1 as separate units, it will be obvious to a person skilled in the art that the units as such may, in certain embodiments, be accommodated in the same housing.

The above detailed description has referred to but a limited number of embodiments of the present invention, but a person skilled in the art will readily perceive that the present invention encompasses a large number of embodiments without departing from the spirit and scope of the appended claims.

What is claimed is:

1. Apparatus for supplying liquid at a controller temperature comprising first and second mixers, a supply conduit for hot liquid under pressure connected to each of said mixers, a supply conduit for cold liquid under pressure connected to each of said mixers, central operating means connected to said mixers for controlling said mixers to supply mixed liquid at determined temperatures at respective outlets of said mixers, first and second outlet conduits respectively connected to the outlets of said first and second mixers, a common conduit connected to said first and second outlet conduits to supply mixed liquid from both said mixers as a combined liquid outflow externally of the apparatus through said common conduit as a first discharge conduit, temperature sensing means in said common conduit connected to said central operating means for control of the mixers, and a tap in said common conduit.

2. Apparatus as claimed in claim 1 comprising a valve in said second outlet conduit.

3. Apparatus as claimed in claim 1 wherein said first mixer has a second outlet, the apparatus further comprising a second discharge conduit connected to said second outlet of said first mixer, and second temperature sensing means in said second discharge conduit connected to said central operating means.

4. Apparatus as claimed in claim 3 wherein said first mixer has smaller flow capacity than said second mixer.

5. The apparatus as claimed in claim 1, wherein one of said mixers includes a second outlet for mixed liquid, said apparatus further comprising a second discharge conduit for outflow of liquid from the apparatus separate from the first said discharge conduit and second tap in said second discharge conduit.

6. The apparatus as claimed in claim 5, comprising a connection between said second discharge conduit and said first outlet conduits to supply mixed liquid from said mixers to both first and second discharge conduits.

7. The apparatus as claimed in claim 6, comprising a non-return valve in said first outlet conduit of one of the mixers to prevent liquid flow in said first outlet conduit to said one mixer from the other said mixer.

8. The apparatus as claimed in claim 7, comprising further non-return valves between each mixer and the respective supply conduits for hot and cold liquid to prevent backflow of liquid from said mixers.

9. The apparatus as claimed in claim 1, wherein each mixer comprises a thermostat mixer.

* * * * *